Aug. 7, 1951 R. COLOMBO 2,563,397
APPARATUS FOR MANUFACTURING TUBES FROM
ARTIFICIAL RESINS, RUBBER AND THE LIKE
Filed Feb. 19, 1948 2 Sheets-Sheet 1

INVENTOR
ROBERTO COLOMBO
BY:
Hazeltine, Lake & Co.
AGENTS

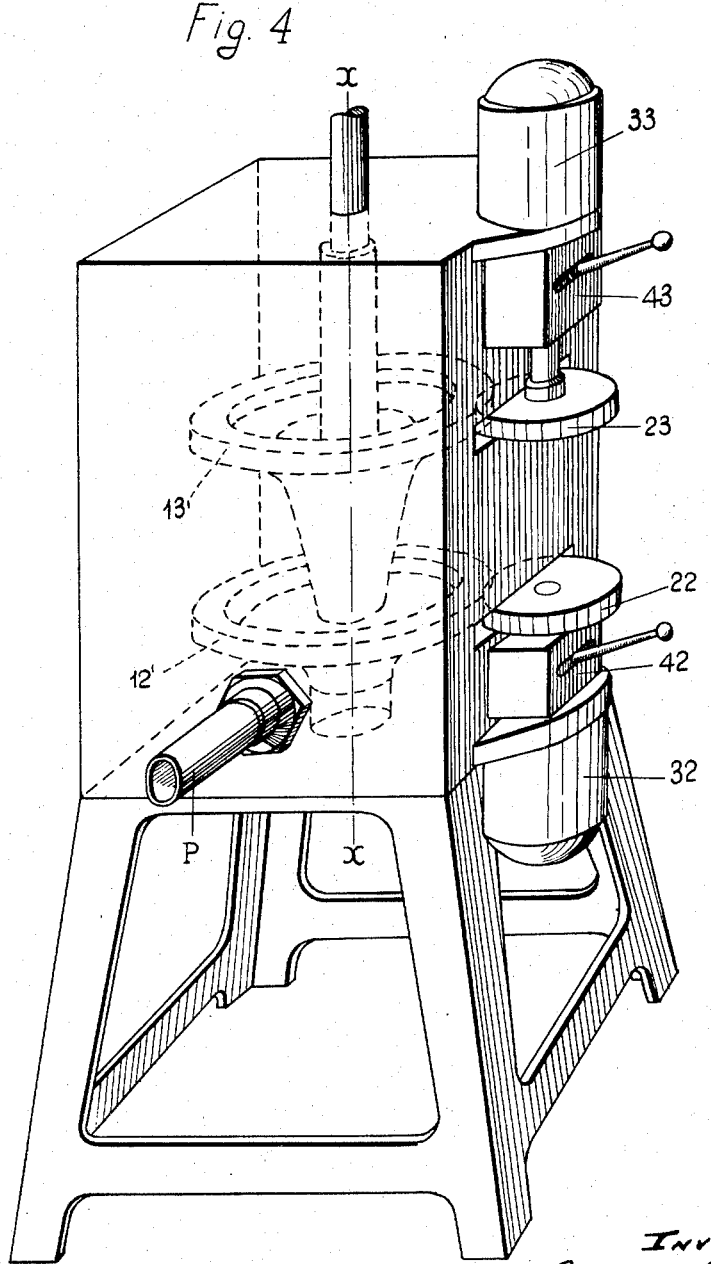

Patented Aug. 7, 1951

2,563,397

UNITED STATES PATENT OFFICE 2,563,397

APPARATUS FOR MANUFACTURING TUBES FROM ARTIFICIAL RESINS, RUBBER, AND THE LIKE

Roberto Colombo, Turin, Italy

Application February 19, 1948, Serial No. 9,586
In Italy March 28, 1945

Section 1, Public Law 690, August 8, 1946
Patent expires March 28, 1965

3 Claims. (Cl. 18—14)

This invention relates to a method and apparatus for the manufacture of tubes from artificial resins, rubber, and the like which are capable of withstanding high internal pressures.

Tubes of rubber, artificial resins and the like, suited for withstanding high pressure are usually manufactured by a process involving a number of successive operations, by which fabric is wound on layers successively formed from the plastic material, or strong threads or wires are successively wound on said layers in the same or opposite directions. Such tubes are, generally, coated with wire braiding. The various steps for manufacturing tubes of the above described type are lengthy and expensive and require elaborate machinery.

The object of this invention is to provide a process, and an apparatus for carrying out said process, by which a tube capable of withstanding high internal pressures is obtained without practically undergoing any deformation either in an endwise or radial direction. According to the invention, the tube is reinforced by means of threads, embedded in the tube, in which they form helical windings, which may be partly right-handed and left-handed, respectively. The armature may be completed, if desired, by longitudinally directed wires. The pitch of the right-handed and left-handed windings may be uniform or different, and may even be such as to obtain windings close to each other.

By the method and apparatus according to this invention, the successive turns of the helices are formed in a continuous manner at the same time as the corresponding tube length from the plastic material in which they are embedded, the tube being also formed continuously. Consequently, the present process is speedier than methods known heretofore for manufacturing tubes suitable for withstanding high internal pressures.

The tubes according to this invention are usefully employed as hose for hydraulic transmissions, for instance in hydraulic brakes for motor vehicles.

The tube according to this invention is preferably made from thermoplastic, such as vinyl derivatives, which already possess per se a considerable strength against tensile and bending stresses and moreover give to the tube adequate flexibility for any use. The armature threads embedded in the tube of artificial resin are conveniently threads of polyamidic resins.

The main feature of the apparatus for carrying out this process resides in the fact that the material, for instance synthetic resin, is conveyed round towards bushes rotating within each other, the innermost bush rotating on a pivot, the extension of which reaches the die opening which forms the bore in the tube. These bushes may be rotated in the same direction or in opposite directions according as to whether right-handed or left-handed helices are to be formed, and are provided with radial holes, annular grooves and annular ports permitting flow of the material to the next bush and distributing the material to the annular ports extending down to an underlying conical conduit in the stationary part of the apparatus, which leads to the die opening. These bushes are further formed with longitudinal holes in their free section between the conduits and radial holes, and threads adapted to form the armature of the tube are passed through said longitudinal holes. The armature threads unwind from spools mounted on discs or cones connected for rotation with the bushes. The ratio between the extrusion speed of the tube and rotational speed of the bushes determines the pitch of the helices of armature threads, which are embedded in the material as the tube is formed.

Further particulars of the invention will be described with reference to the accompanying drawings which show, by way of example, one construction of the apparatus according to this invention.

Fig. 4 is a perspective view of the apparatus showing the means for rotating the bushes.

Figure 1:
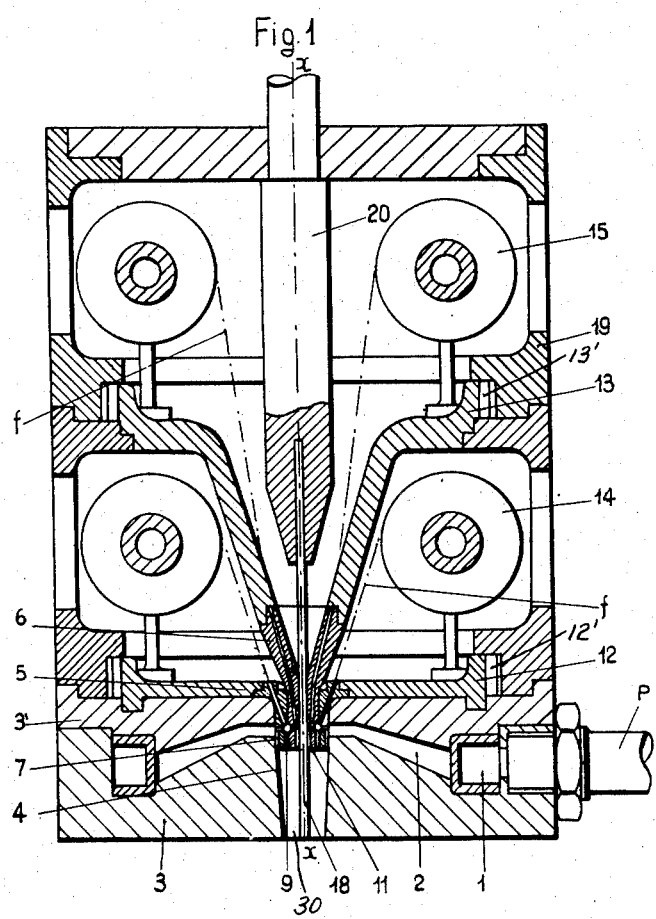
Figure 1 is an axial section of the apparatus.
Figure 2:
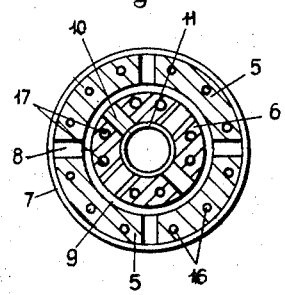
Figure 2 is a cross sectional view on an enlarged scale of the set of rotating bushes which, in this case are two.
Figure 3:
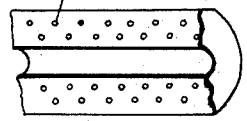
Figure 3 shows diagrammatically in axial section a length of the tube manufactured according to this invention.

The apparatus shown on the drawing is associated with a conventional extrusion press, for instance of the type embodying one or more screws. By means of this apparatus, the process according to the invention is carried out in full, as the tube being the finished article is manufactured in one step direct from the raw materials, synthetic resin and armature threads of polyamid resin.

The plastic material delivered from the extrusion press P is injected into the circular bush 1 which distributes it to the space 2 formed between the superposed sections 3 and 3' of the apparatus, extending to an axial conduit formed in the said sections, having the superposed bushes 5, 6 mounted in its upper portion, while the lower portion is tapered to frustrum shape and ends by the die opening 30 forming the tube. The bushes 5 and 6 rotate on each other, and the inner bush 6 rotates on the pivot 18 arranged along the axis X—X of the apparatus and die opening 30. The bush 5 is provided with an annular groove 7 facing in part the clearance 2, and opens into the chamber in the conical conduit 4 forming the tube. Holes 8 extend radially from the annular groove 7 and lead to a groove 9 cut partly in the bush 5 and 6, respectively. The groove 9 extends to the chamber forming the tube. Holes 10 lead radially from the groove 9 to an annular groove 11 extending to the conical chamber 4, so that material issues along the pivot 18. The bushes 5 and 6 are fixedly connected with a disc 12 and a funnel-shaped cone, respectively. The disc 12 is formed at its periphery with a toothed wheel 12′ and the cone ends by an annular disc 13 which is also formed at its periphery with a toothed wheel 13′. The toothed wheels 12′—13′ mesh with toothed wheels 22—23 which are driven by electric motors 32—33 through change speed gears 42—43 at a predetermined speed. The bushes 5 and 6 are formed, out of range of the radial conduits 8 and 10, with longitudinal holes 16 and 17, respectively, through which pass threads f which unwind from spools 14 and 15, respectively, mounted on the disc 12 and cone 13. The pivot 18 is carried by the insert 20 extending axially through the apparatus along the axis X—X, and is secured to the upper end of the apparatus, having the spools 14 and 15 mounted in its inner cavity.

The device operates as follows:

The bushes are rotated by means of toothed wheels 22—23 to the right and left, respectively, at the same time, the extrusion press P is set into action and forces the plastic material into the chamber 2, from which the material flows through the grooves and radial conduits in the form of tubular elements into the tapered chamber 4 as the right-handed and left-handed helices are formed in this chamber from the threads f, said helices being embedded in the mass of the material pressed between the tapered walls and pivot 18, and carried along with it, so that the die opening 30 delivers the tube incorporating the armature threads in the form of helical windings.

When it is desired to incorporate in the tube supplementary longitudinal armature wires, a stationary bush is added to the rotating bushes 5 and 6, and is formed with grooves and radial holes for the material and longitudinal holes for the supplementary threads which are carried along by the material and embedded in the tube.

It will be obvious that the form and constructional details of the apparatus may be varied from the constructions described and illustrated by way of example, without departing from the scope of this invention.

What I claim is:

1. In apparatus for manufacturing tubes of thermoplastic material, rubber and the like having one or more layers of reinforcing threads helically wound and embedded therein, the combination comprising an extrusion press, an extrusion die, means defining a circular chamber through which the press communicates with the die, a plurality of concentric bushes coaxial with the chamber, means for independently rotating the bushes, at least one spool carrying the reinforcing thread connected to each bush for rotation therewith about the chamber axis, each bush being provided with at least one radial passage receiving material delivered by the press to the chamber and at least one longitudinal passage receiving thread from the spool and delivering it to the die side of the bush, and an annular groove in the opposed surfaces of each of the bushes defining a chamber between each pair of bushes communicating with the radial passages thereby to permit flow of material from the press through the bushes to the die.

2. Apparatus as claimed in claim 1 wherein the means for rotating the bushes comprises a toothed wheel connected to each bush and means for rotating said toothed wheels in the same direction, whereby the threads are helically wound in the same direction.

3. Apparatus as claimed in claim 1 wherein the means for rotating the bushes comprises a toothed wheel connected to each bush and means for rotating the toothed wheels in opposite directions whereby the threads are helically wound in opposite directions.

ROBERTO COLOMBO.

REFERENCES CITED

The following references are of record in the file of this patent:

UNITED STATES PATENTS

| Number | Name | Date |
|---|---|---|
| 1,111,418 | Wadsworth | Sept. 22, 1914 |
| 1,637,207 | Whitehouse | July 26, 1927 |

FOREIGN PATENTS

| Number | Country | Date |
|---|---|---|
| 810,638 | France | Mar. 24, 1937 |